No. 799,094. PATENTED SEPT. 12, 1905.
M. C. SCHWEINERT & H. P. KRAFT.
CLAMPING DEVICE FOR PNEUMATIC TIRES.
APPLICATION FILED FEB. 3, 1905.

WITNESSES:
Fred White
René V. Muine

INVENTORS:
Maximilian Charles Schweinert
and Henry P. Kraft,
By Attorneys,
Arthur E. Fraser Co.

UNITED STATES PATENT OFFICE.

MAXIMILIAN CHARLES SCHWEINERT, OF WEST HOBOKEN, NEW JERSEY, AND HENRY P. KRAFT, OF NEW YORK, N. Y.

CLAMPING DEVICE FOR PNEUMATIC TIRES.

No. 799,094. Specification of Letters Patent. Patented Sept. 12, 1905.

Application filed February 3, 1905. Serial No. 244,063.

*To all whom it may concern:*

Be it known that we, MAXIMILIAN CHARLES SCHWEINERT, residing at West Hoboken, in the county of Hudson and State of New Jersey, and HENRY P. KRAFT, residing in the borough of Brooklyn, county of Kings, city and State of New York, citizens of the United States, have invented certain new and useful Improvements in Clamping Devices for Pneumatic Tires, of which the following is a specification.

This invention relates to clamping devices for pneumatic tires and aims to provide certain improvements therein.

Pneumatic tires for automobile or other heavy vehicles are now commonly made with an inner air-tube and an outer shoe, the latter having its edges enlarged to form flanges which fit within circumferential recesses or channels formed in the wheel-rim, the shoe being held in place by clamping devices disposed at intervals around the rim and having retaining blocks or plates of appropriate shape fitting between the inner edges of the tire-shoe and holding the flanges thereof securely in place within the channels of the rim. In the usual form of such clamping devices the retaining-plates are fitted with long screw-threaded bolts, which pass through the rim and receive nuts which bear against the inner face of the rim and hold the bolts in position. In this construction the bolts project inwardly beyond the rim a considerable distance, and it is desirable that some means be provided to protect them from injury and to exclude dust therefrom. It is also desirable to provide a means for locking the nuts in position on the bolts, so that they will not work loose in use.

This invention provides an improved construction of clamping device which is capable of performing these several functions and which has certain other advantages hereinafter referred to.

Figure 1:
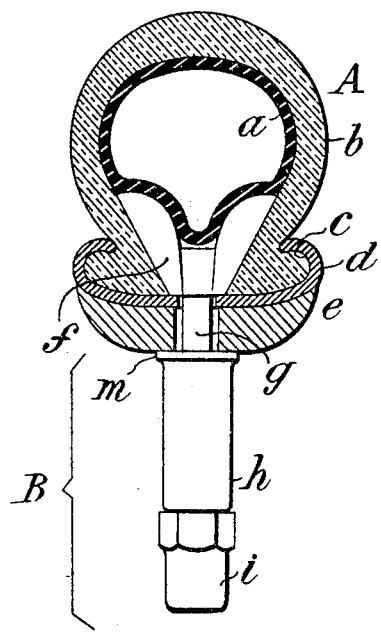
Figure 2:
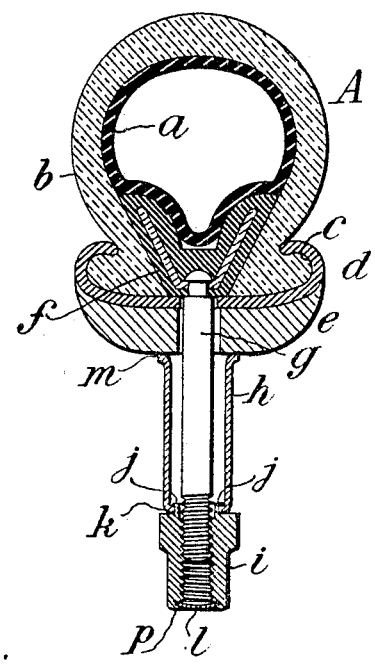
Figure 3:
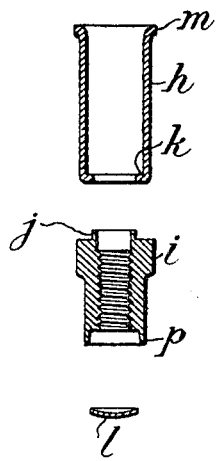

Referring to the drawings, which illustrate the preferred form of our invention as applied to an automobile-tire, Figure 1 is a cross-section of a tire and felly, showing our improved clamping device in elevation. Fig. 2 is a similar view showing the device in section. Fig. 3 is a longitudinal section of the parts which compose the device detached.

Referring to the drawings, let A designate a pneumatic tire comprising an inner air-tube $a$ and an outer shoe $b$. The shoe $b$ is formed at its sides with enlarged edges which fit in circumferential channels or recesses $c$ in the rim $d$ of the felly $e$. In the construction shown the tire is held fixedly upon the rim by a series of clamping-plates $f$, which are of such shape as to fit between the enlarged edges of the tire-shoe and prevent the lateral escape of the latter from the rim-channels. Each of the plates $f$ is held in position by a bolt $g$, which passes inwardly through the felly and which is formed with a screw-thread adapted to be engaged by a nut which bears against the felly. To facilitate attachment of the tire to the rim, the bolts $g$ are usually made of considerable length, so that they project inwardly a considerable distance beyond the felly. It is practically necessary to protect such protruding ends against injury to the threads, access of dust, &c., and it is also desirable, if not essential, to so lock the nuts which engage the bolts that they shall not work loose under the strain to which they are subjected. Ordinarily the bolt $g$ has been threaded at a point closely adjacent to the felly and the nut has been so formed that it contacted directly with the latter when screwed home. To do this, it has been necessary to either screw-thread the bolt for its full length or to reduce the diameter of the unthreaded portion to permit the nut to pass over it. According to the present invention we provide a construction of clamping-nut which permits the screw-threading of only the projecting end of the bolt, which fully protects the latter throughout its entire length and which securely locks itself in place, so that it will not work loose in use. This construction also possesses the important advantages of having no separable parts and of being much cheaper in initial cost than those heretofore employed.

B indicates our improved clamping-nut as a whole. Preferably it comprises an elongated sleeve $h$, which is of sufficient diameter to freely fit over the bolt, as shown, and a nut $i$, connected with the sleeve $h$ and adapted to engage the outer end of the bolt $g$, which need be screw-threaded only to the extent necessary to engage the nut. When the nut is screwed home upon the bolt, the inner end of the sleeve engages the felly, and the clamping-plate is drawn firmly down into position. We prefer to construct the sleeve $h$ of sheet metal drawn to tubular form and to attach it to the nut $i$ by reducing the latter to form a flange $j$, which fits into the end of the sleeve, the latter being formed with a flange $k$, over which the flange $j$ is upset, as shown in Fig. 2. The sleeve $h$ should be formed of sufficient thickness to withstand the compressive strain to which it is subjected. It is preferable that the sleeve and nut be swiveled together in order that the nut may be rotated independently of the sleeve, so that the latter may remain stationary after it engages the felly. This construction provides an efficient lock for the nut when the latter is screwed home. The sleeve is preferably formed at its free end with a flange $m$, which provides a broad bearing-surface to prevent the sleeve from cutting into the rim.

In the construction shown the nut $i$ is formed with a closed outer end, and while this may be obtained in any suitable manner we prefer to bore and screw-thread the nut throughout its entire length and to close the outer end thereof with a sheet-metal cap $l$. The nut in this construction is counterbored to form a suitable recess for the cap, the circular flange $p$ thus formed upon the nut being turned down over the cap in a suitable swaging-machine or otherwise.

It will be observed that the device described and shown provides an efficient protective casing for the projecting portion of the bolt.

The proportions of the parts need not necessarily be those illustrated so long as the device is capable of protecting the bolt to the extent desired.

We prefer to form the sleeve of sheet metal, as this provides sufficient strength of construction at much less cost than a sleeve formed of solid metal drilled to provide a bore of requisite dimensions. The latter construction may be used, however, if desired.

While our invention provides a more economical form of bolt than those now used in that it is necessary to screw-thread only its extreme end, it will of course be apparent that our improved clamping-nut is susceptible of use with the ordinary form of bolt or with any other form which provides a suitable thread for engagement with the nut.

We claim as our invention the following-defined novel features, substantially as hereinbefore specified, namely:

1. In a clamping device, a nut adapted to engage a bolt, and a sheet-metal sleeve connected to said nut, said sleeve being open at both ends and being adapted to inclose a portion of the bolt and form a protecting-casing therefor.

2. In a clamping device, a nut adapted to engage a bolt, and a sleeve swiveled to said nut and adapted to bear against the wheel-felly.

3. In a clamping device, a nut adapted to engage a bolt, and a sheet-metal sleeve swiveled to said nut and adapted to bear against the wheel-felly.

4. In a clamping device, a nut adapted to engage a bolt, and a sleeve connected to said nut and adapted to bear against the wheel-felly at one end, and having at such end a flange $m$.

5. In a clamping device, a nut adapted to engage a bolt, and a sheet-metal sleeve swiveled to the end of said nut, and adapted to bear against the wheel-felly, said sleeve being formed with a flange $k$, and said nut being formed with a flange $j$ overlying that of the sleeve.

6. The combination of a clamping-plate, a bolt attached thereto and adapted to project beyond the wheel-felly, said bolt being threaded at its outer end, a nut adapted to engage such end, and a sleeve connected to the nut and adapted to inclose an intermediate portion of the bolt.

7. The combination of a clamping-plate, a bolt attached thereto and adapted to project beyond the wheel-felly, said bolt being threaded at its outer end, a nut adapted to engage such end, and a sleeve swiveled to the nut and adapted to inclose an intermediate portion of the bolt.

8. In a clamping device, a nut adapted to engage a bolt, having a bore extending therethrough, and a cap at the outer end of said nut closing said bore, and a sleeve connected to said nut at its opposite end and adapted to inclose a portion of the bolt and form a protecting-casing therefor.

In witness whereof we have hereunto signed our names in the presence of two subscribing witnesses.

MAXIMILIAN CHARLES SCHWEINERT.
HENRY P. KRAFT.

Witnesses:
DOMINGO A. USINA,
THEODORE T. SNELL.